Feb. 16, 1937. W. F. BRONSELL 2,070,855
BULL PLUG PIPE CONNECTION
Filed Nov. 30, 1934
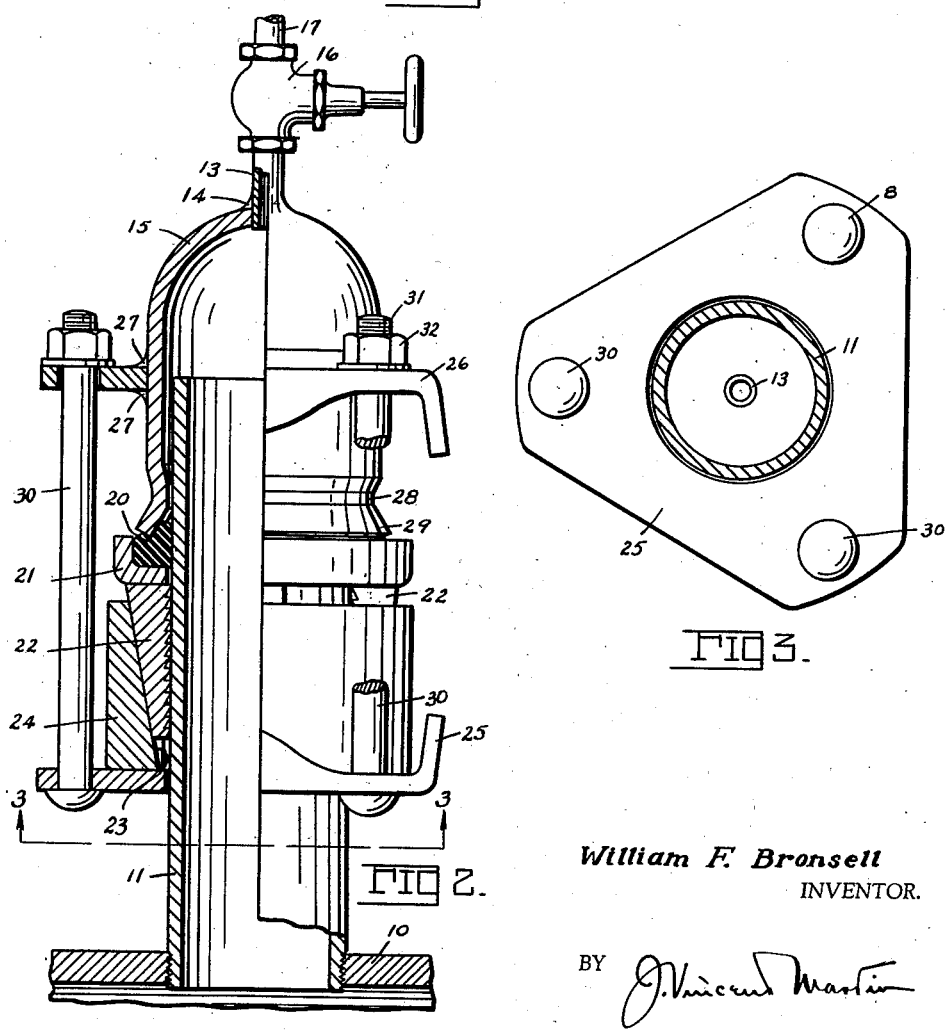
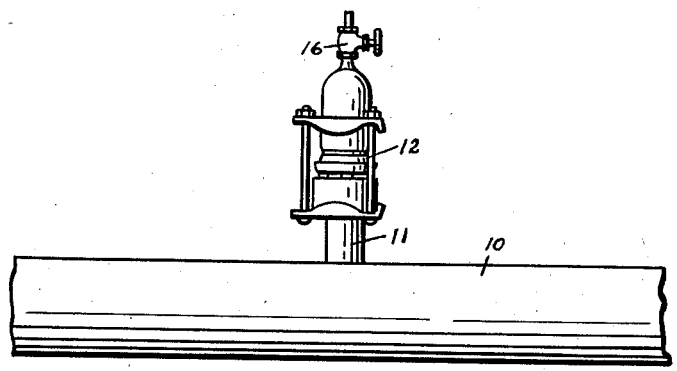
William F. Bronsell
INVENTOR.
BY 
ATTORNEY.

Patented Feb. 16, 1937

2,070,855

UNITED STATES PATENT OFFICE 2,070,855

BULL PLUG PIPE CONNECTION

William F. Bronsell, Edna, Tex.

Application November 30, 1934, Serial No. 755,282

2 Claims. (Cl. 138—89)

This invention relates to capping or sealing of pipe lines and more particularly to the placing of bull plugs upon gas lines or the like.

It has been common practice to seal pipe lines of this type by welding, among other modes of procedure. In the welding of gas lines it is extremely difficult, if not practically impossible, to effectually eliminate the gas. Thus the heat of a torch or the heat from an electric arc is quite likely to ignite the gas and either cause a serious explosion or to at least involve losses of material and time. It has been the practice to erect flares from the gas lines, at points remote from the end and light them to carry off any gas which may be leaking in the line. This procedure consumes considerable time and is costly in both material and labor, and also involves certain dangers.

Among the objects of the present invention may be mentioned the avoidance of these expensive operations in both material and time, as well as the avoidance of the danger of explosion. Further objects may be mentioned, as the ability to seal a line in a more rapid manner without involving expensive equipment, and the construction of a bull plug of such simple construction as will be easily manufactured and very readily applied.

The foregoing and other objects have been attained by the construction of a bull plug of relatively few parts which may be readily assembled to a pipe line, and which may utilize the pressure in the pipe line itself for aiding and insuring its firm retention upon the line.

This invention will be better understood when considered in connection with the various figures of the accompanying drawing.

Fig. 1 is a side elevation of a short section of pipe line with the bull plug in position.

Fig. 2 is an enlarged view of the construction of Fig. 1, portions being shown in section.

Fig. 3 is a view on the line 3—3 of Fig. 2.

I have illustrated the features of this invention by a particular embodiment wherein the bull plug has been attached to a short section of pipe emanating from a main pipe line. It is quite apparent, however, that the same construction may be utilized upon the main pipe line itself, merely involving changes in direction and minor rearrangements of parts, for example, the addition of a greater or lesser number of slips depending upon the diameter of the pipe.

In Fig. 1 the main pipe line 10 is illustrated as having a short section of pipe 11 extending therefrom. This short section of pipe is sealed by means of a bull plug 12 incorporating the features of this invention. At the outer end of the bull plug away from the pipe a small pipe connection and valve are attached for the purposes of providing a means of bleeding the pipe line until the connections of the bull plug are definitely completed. This latter means comprises a pipe 13, arc welded at 14 to the bull plug 15, the outer end of the pipe having a valve 16 secured thereon. This latter valve may be connected to a pipe, to a flare, or to a pressure gauge or to any other suitable connections, for example allowing the device to exhaust into the atmosphere.

The bull plug 15 is secured to the pipe section 11 with a yieldable seal preferably in the form of a rubber packing ring 20. This packing ring is carried in a sheet metal follower 21 which surrounds the pipe 11 and rides upon the surfaces of the slips 22. These latter members are preferably tapered into wedge shaped form and have the surface which is adjacent to the pipe serrated or provided with suitable teeth so that a firm gripping action can be obtained. There are generally a plurality of these slips depending upon the size of the pipe line, preferably three or more in number. Slips are retained in position with respect to the pipe by a ring 24 having a plurality of internal grooves 23. The follower 25 is positioned about the pipe adjacent the ring 24, and may be made integral therewith, depending upon expediencies in use. A similarly shaped follower 26 is fastened to the bull plug by welding as at 27. The bull plug is generally bell-shaped in form, preferably fitting closer to the pipe at an intermediate zone 28 and flaring outwardly at 29, so as to circumferentially seal the pipe line when pressed against the rubber washer 20. To complete the assembly the followers 25 and 26 are drawn together and retained in assembled relation by means of bolts 30 which are drawn tight through the intermediation of the threaded end connections 31 and nuts 32. Any pressure in the pipe line reacts against the bull plug 15. This reaction is transferred to the ring 24 by the bolts 30, and any movement of the ring creates a wedging action by the slips 22 forcing them more firmly into contact with the pipe and thereby prevents the slips from in any manner becoming released from their pipe-gripping position.

While I have illustrated my invention by one specific embodiment, I aim to cover in the appended claims all variations within the true spirit and scope of my invention.

I claim:

1. The combination with a pipe line of a bull plug comprising a plurality of slips gripping the pipe adjacent its end, a slotted ring holding said slips, a follower engaging said ring, a resilient washer engaging said pipe, a follower engaging said slips and surrounding said washer, a plug encompassing the end of said pipe and abutting said washer and means interconnecting said first named follower, and said plug.

2. The combination with a pipe line of a bull plug comprising a plurality of slips gripping the pipe adjacent its end, a slotted ring holding said slips, a follower engaging said ring, a resilient washer engaging said pipe, a follower engaging said slips and surrounding said washer, a plug encompassing the end of said pipe and abutting said washer and means interconnecting said first named follower, and said plug, said parts being arranged whereby forces tending to blow the plug from the pipe end are utilized to effect a firmer gripping of the slips.

WILLIAM F. BRONSELL.